No. 660,391. Patented Oct. 23, 1900.
J. B. PEDRICK.
GRAIN SEPARATOR.
(Application filed July 1, 1898.)
(No Model.) 5 Sheets—Sheet 1.
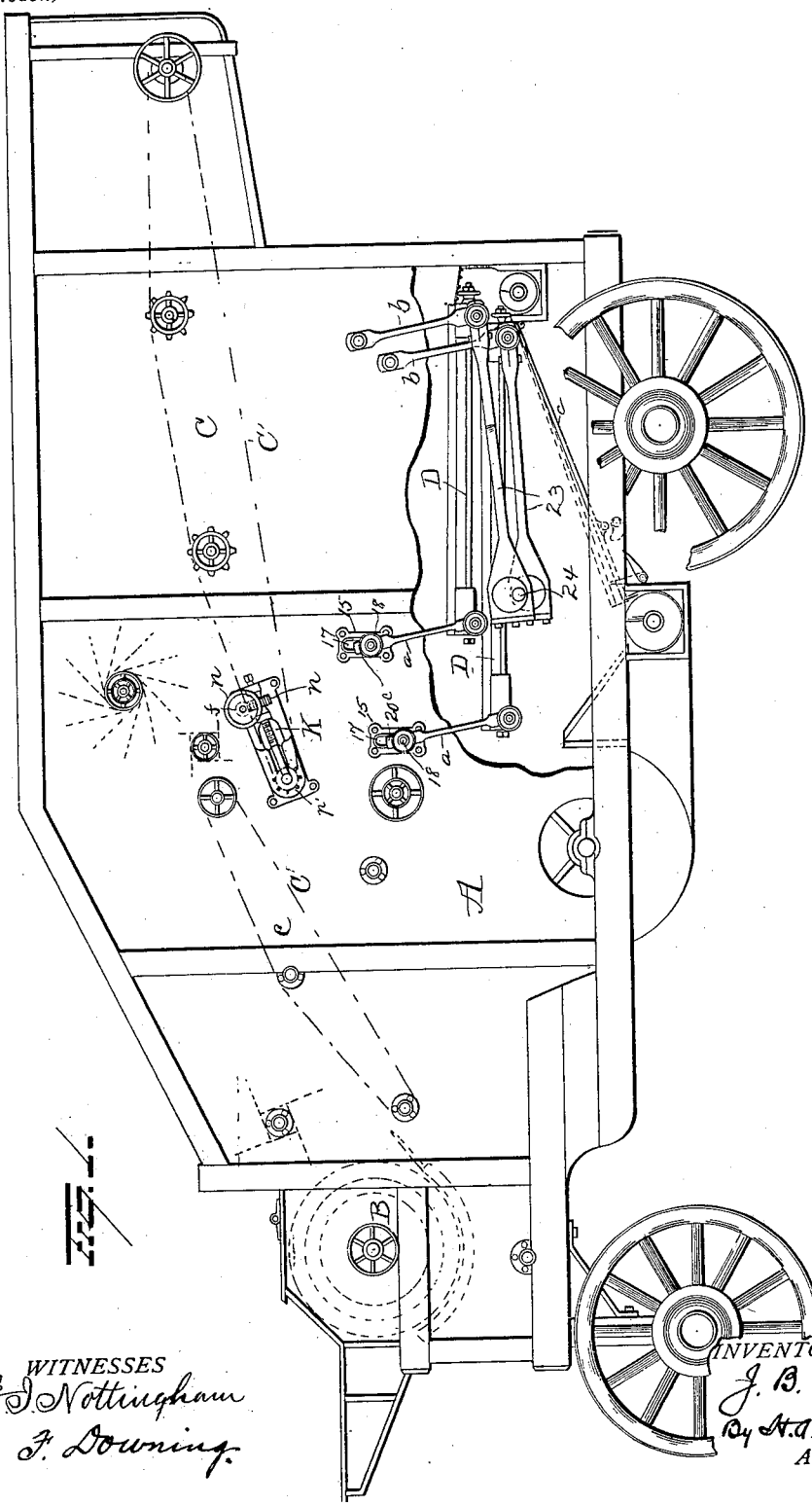
WITNESSES
E. S. Nottingham
G. F. Downing
INVENTOR
J. B. Pedrick
By H. G. Seymour
Attorney

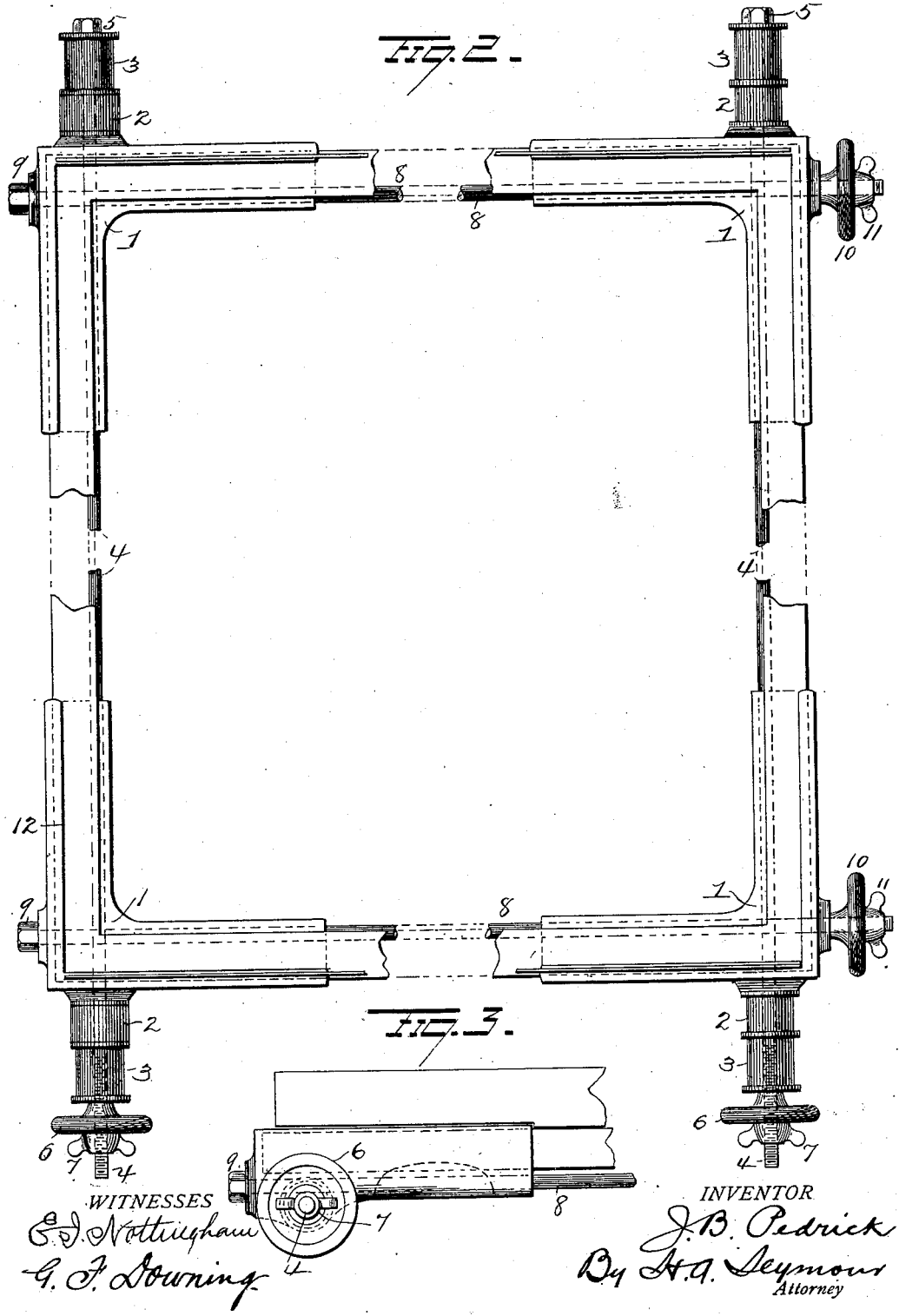

No. 660,391. Patented Oct. 23, 1900.
J. B. PEDRICK.
GRAIN SEPARATOR.
(Application filed July 1, 1898.)
(No Model.) 5 Sheets—Sheet 3.
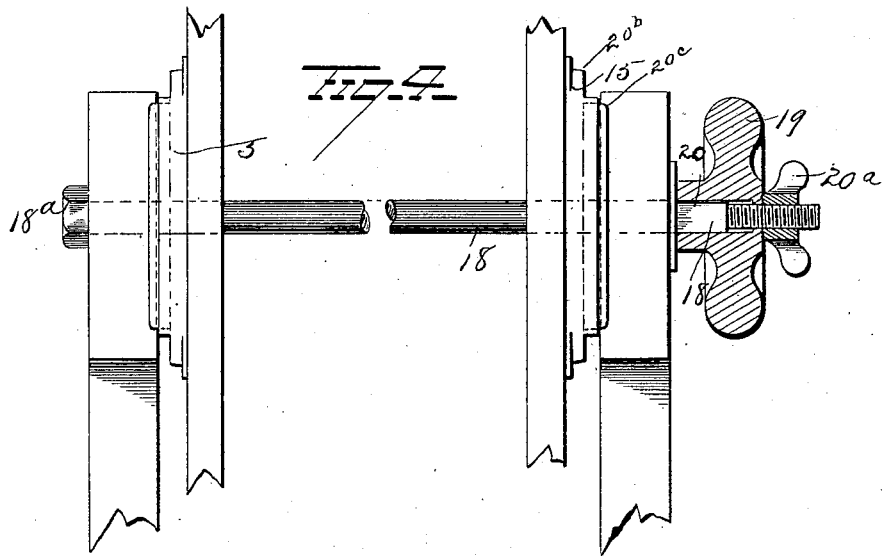
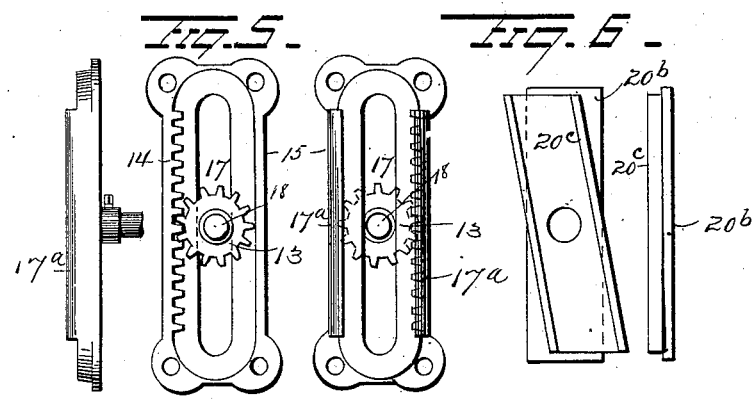
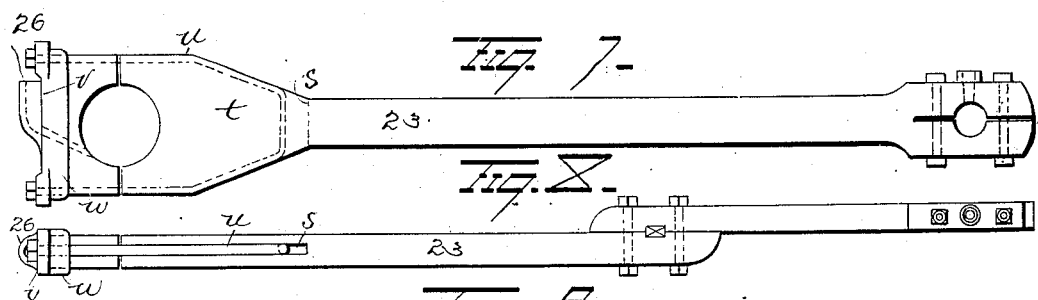
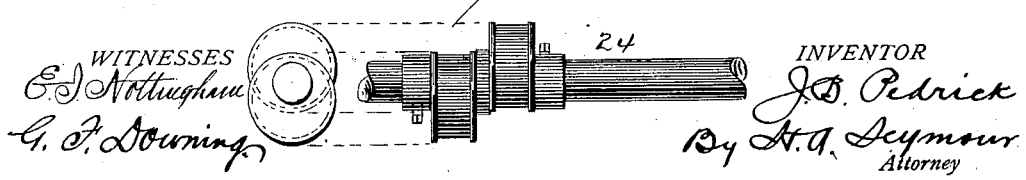
WITNESSES
E. J. Nottingham
G. F. Downing
INVENTOR
J. B. Pedrick
By H. A. Seymour
Attorney
THE NORRIS PETERS CO., PHOTO-LITHO., WASHINGTON, D. C.

No. 660,391. Patented Oct. 23, 1900.
J. B. PEDRICK.
GRAIN SEPARATOR.
(Application filed July 1, 1898.)
(No Model.) 5 Sheets—Sheet 4.
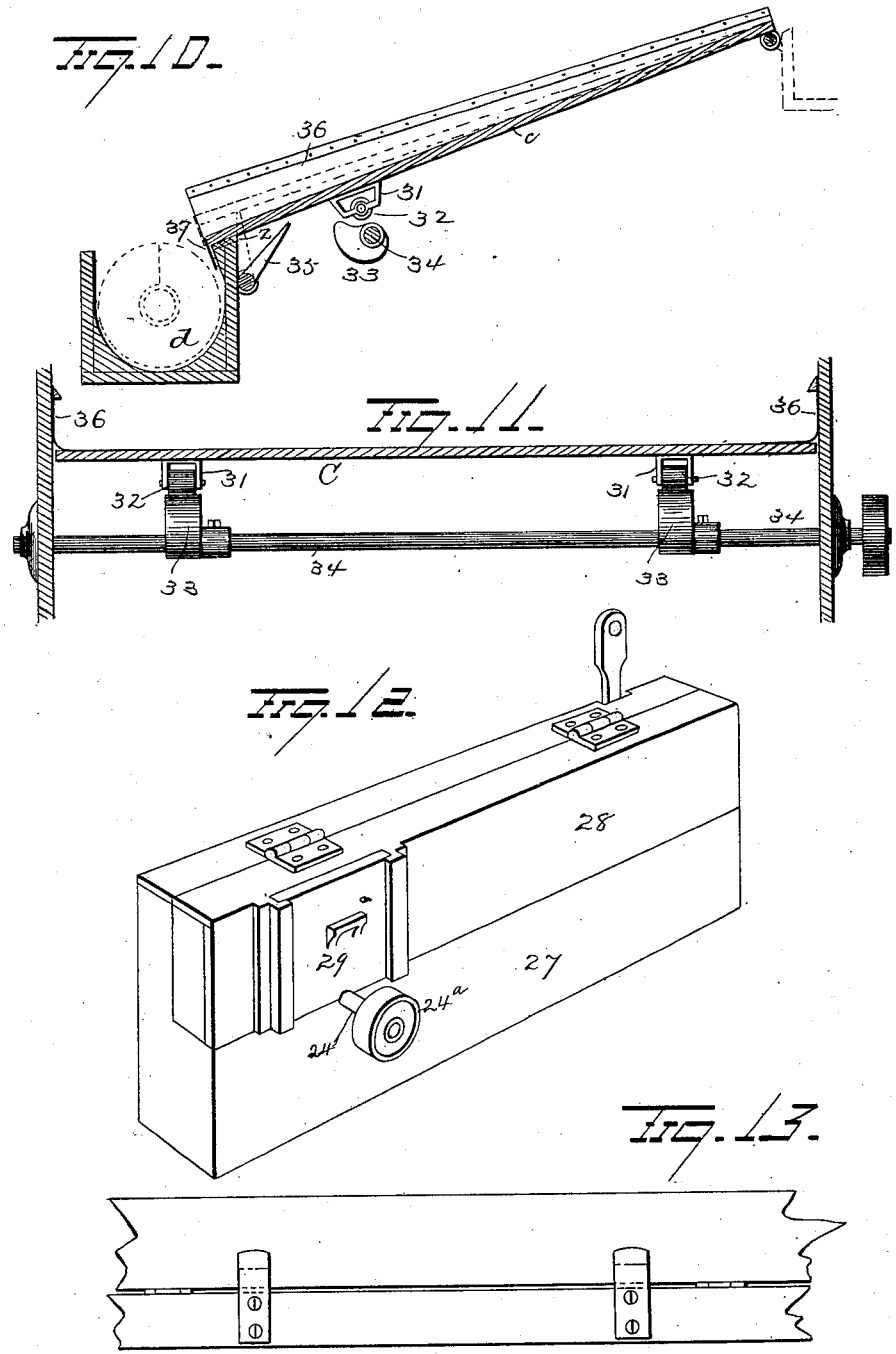
WITNESSES
E. J. Nottingham
G. F. Downing
INVENTOR
J. B. Pedrick
By H. A. Seymour
Attorney No. 660,391. Patented Oct. 23, 1900.
J. B. PEDRICK.
GRAIN SEPARATOR.
(Application filed July 1, 1898.)
(No Model.) 5 Sheets—Sheet 5.
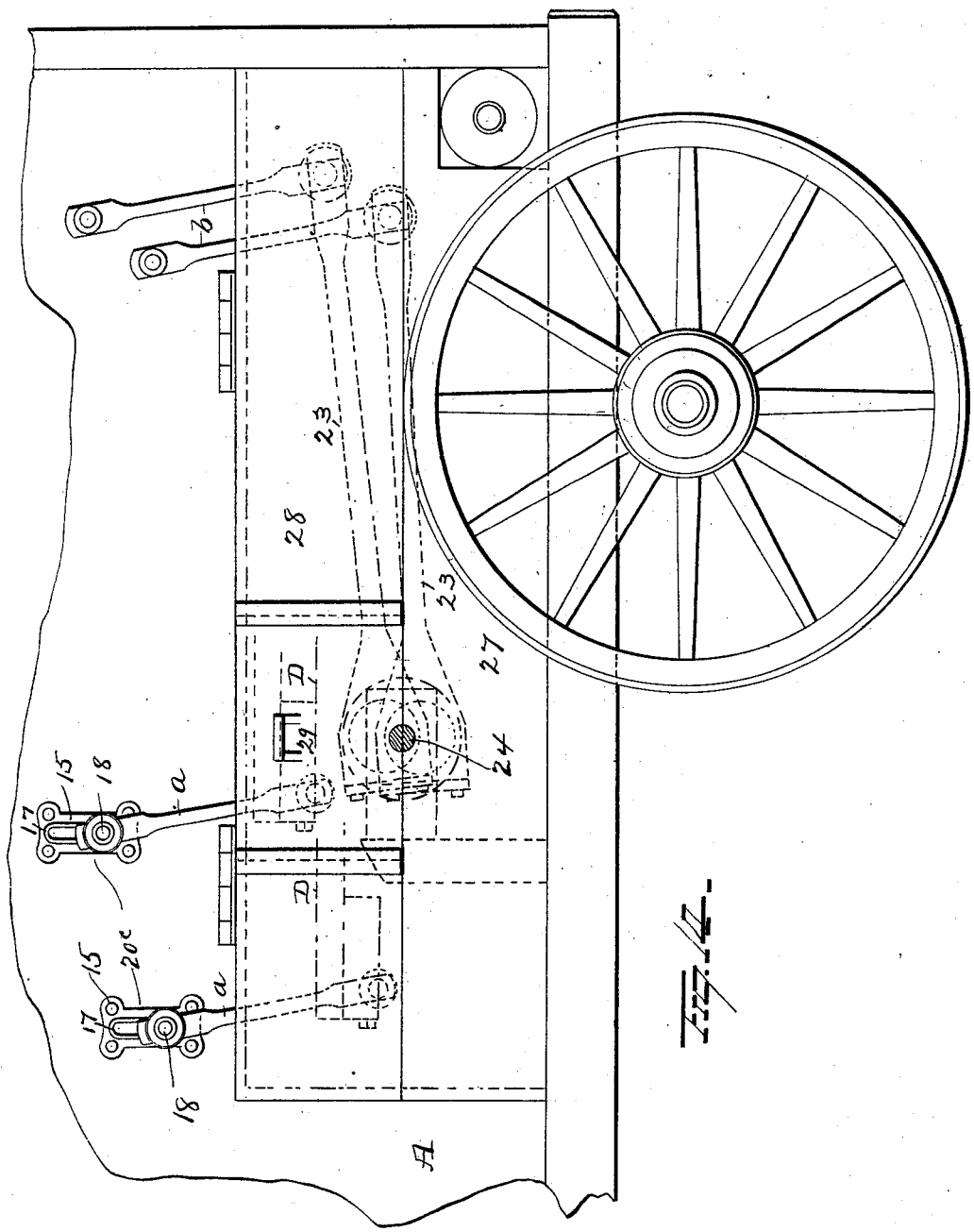
WITNESSES
E. J. Nottingham
G. F. Downing
INVENTOR
J. B. Pedrick
By H. A. Seymour
Attorney
THE NORRIS PETERS CO., PHOTO-LITHO., WASHINGTON, D. C.

UNITED STATES PATENT OFFICE.

JOSEPH B. PEDRICK, OF COLUMBUS, INDIANA.

GRAIN-SEPARATOR.

SPECIFICATION forming part of Letters Patent No. 660,391, dated October 23, 1900.

Application filed July 1, 1898. Serial No. 684,968. (No model.)

*To all whom it may concern:*

Be it known that I, JOSEPH B. PEDRICK, a resident of Columbus, in the county of Bartholomew and State of Indiana, have invented certain new and useful Improvements in Grain-Separators; and I do hereby declare the following to be a full, clear, and exact description of the invention, such as will enable others skilled in the art to which it appertains to make and use the same.

My invention relates to an improvement in grain-separators, one object of the invention being to provide a machine that will be comparatively simple in construction and most effectual when in operation.

A further object is to so construct riddles for grain-separators that they will be adjustable to accommodate different-sized screens in the riddle-frames.

A further object is provide simple and efficient means whereby to adjust one end of the riddles vertically.

A further object is to provide simple means for vibrating or agitating an inclined conveyer or grain-board, over which the grain from the riddles passes.

With these objects in view the invention consists in certain novel features of construction and combinations and arrangements of parts, as will be more fully hereinafter described, and pointed out in the claims.

In the accompanying drawings, Figure 1 is an elevation of a threshing-machine embodying my improvements, and Figs. 2, 3, 4, 5, 6, 7, 8, 9, 10, 11, 12, and 13 are views of details. Fig. 14 is a view showing the housing 27 in place on the machine.

A represents a frame or housing, B a cylinder and concave of any approved construction, and C mechanism for passing the straw and grain to my improved riddles D. The general construction and operation of these means for conveying the grain and straw to the riddles are described in my former application, and it will therefore be unnecessary to describe the same in detail in this application.

The riddles D are each provided with four corner-brackets 1, which have disposed thereon cylindrical projections 2, adapted to enter holes in pitman $a$, which will be hereinafter more fully described. Cylindrical extensions 3, preferably smaller in diameter than the projections 2, are secured to the outer ends of the projections 2 and are adapted to receive thereon the hangers or supports $b$, which will also be more fully hereinafter described. Longitudinal rods 4 4 are adapted to connect the brackets 1 and are provided each at one end with a head 5 and a wheel-nut 6 and lock-nut 7 at their other ends to regulate the size of the riddle and clamp the screen or riddle frame in place. Horizontal rods 8 8 also connect these brackets 1 and are provided with nuts 9 at one end and screw-threaded wheel-nuts 10 and lock-nuts 11 at their other ends to regulate the width of the riddle and clamp the screen or riddle frame in place. A recess 12 is formed in the corner-brackets 1 to receive the riddle-frame therein. The corner-brackets 1 may be cut away, as shown at $12^a$, to lighten same. The rear hangers $b$ are pivotally connected at their upper ends with the frame A by any approved means and at their lower ends with the riddle, as above described. Brackets 15 are secured to diametrically-opposite sides of the frame and are provided with vertical slots 17, having flanges $17^a$ at the sides thereof, one of said flanges being provided with rack-teeth 14. A shaft 18 passes through the slotted brackets 15 and carries pinions 13, adapted to mesh with the rack-teeth 14. The shaft is provided on one end with a nut $18^a$, and the other end of the shaft has loosely mounted thereon a wheel 19, provided with an extended angular bearing 20 for the reception of the angular portion of shaft 18. A lock-nut $20^a$ is screwed on the end of shaft 18 and adapted to bear against the hub of wheel 19. A plate $20^b$ is disposed between the flanges on each bracket 15, and integral with said plate a flanged plate $20^c$ is disposed, the shaft 18 passing loosely through said plates. The flanged plates $20^c$ serve to receive the upper ends of the hangers $a$. The upper ends of the forward hangers are thus held between the plates $20^c$ and the hubs of the wheels 19 on the shaft 18 at one side of the machine and between plates $20^c$ and the nut $18^a$ at the other side of the machine. By manipulating the hand-wheel 19 the upper supports of the forward hangers can be moved and held in any desired adjustment by the lock-nut 20ª. Pitmen 23 23 are mounted at one end on a crank-shaft 24 in the frame and are connected at their other ends to the projections 2 on the riddle-brackets 1. A groove or recess $s$ is provided in the larger end of said pitmen, in which the block $t$, preferably of wood, is inserted. A strap $u$ is passed around said block $t$ and adapted to extend through a plate $v$ on the end of said pitmen, which plate is secured in place by the clamps $w$. The ends of the strap $u$ are screw-threaded for the reception of nuts, as shown. The plate $v$ is provided with an oil-cup 26, which communicates with the bearing of the pitmen on the crank-shaft by an oil-duct $x$ to supply oil to said bearing. The crank-shaft 24 is provided with a pulley 24ª outside of the frame and adapted to be turned by any approved means. A housing 27 is disposed around the pitmen and crank-shaft and provided with a hinged side section 28 and sliding door 29 to permit ready access to the pitmen without removing the housing.

The grain after passing through the riddles falls upon an inclined grain-board or conveyer $c$ and passes to the ejector or screw conveyer $d$. The grain-board $c$ is pivotally connected to the frame at its rear end, and its forward end is adapted to rest on a cushion $z$ on the top edge of one side of the ejector-box. A bracket 31 is secured on the lower face of said grain-board, and has mounted therein a roller 32, which is engaged by a cam 33, mounted on a shaft 34, to vibrate or agitate the conveyer when necessary to compel the grain to pass down into the ejector or conveyer-box, due to dampness of the grain or from any other cause. When, however, this is not necessary, the support or arm 35, which is pivotally connected to the side of the ejector-box, may be turned upward and made to hold the grain-board out of reach of the cam and do away with the agitation thereof. The grain-board $c$ may be provided with side pieces 36, preferably of yielding material, to guide the grain and prevent its falling from said grain-board. A downwardly-extending lip 37 may be provided at the forward end of said grain-board to insure the falling of the grain into the ejector-box.

Various slight changes might be made in the general form and arrangement of the several parts described without departing from the spirit and scope thereof, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a grain-separator, the combination of a series of angular brackets adapted to receive a riddle, rods connecting said brackets, two of said rods passing through each bracket and disposed at right angles to each other, and an adjusting device on one end of each rod, whereby to accommodate said brackets to riddles differing in dimensions.

2. In a grain-separator, the combination of a series of angular brackets adapted to receive a riddle, a cylindrical projection on each bracket, hangers connected with said projections, a pitman connected with one of said projections, rods passing through said brackets and projections, two of said rods passing at an angle to each other through each bracket, and adjusting devices on one end of each rod.

3. In a grain-separator, the combination with a framework, of a riddle-frame, hangers pivoted to the framework and to the riddle, a crank-shaft, a pitman connected with said crank-shaft and riddle, and a housing inclosing said crank-shaft and pitman, said housing having a hinged cover, and a slide in said cover.

4. In a grain-separator the combination with a framework and a riddle, of a slotted bracket secured to the framework and having rack-teeth, a shaft projecting through said slotted bracket, a pinion on said shaft meshing with the rack-teeth, a plate loosely mounted on the shaft, a nut on the shaft and a hanger confined at its upper end between said plate and nut and pivoted at its lower end to the riddle, substantially as set forth.

5. In a grain-separator, the combination with framework and a riddle, of a bracket, a plate adapted to slide in said bracket, a pivoted plate connected with the first-mentioned plate, means for moving said plates vertically, and a hanger connected at one end to said pivoted plate and pivoted at the other end to the riddle, substantially as set forth.

In testimony whereof I have signed this specification in the presence of two subscribing witnesses.

JOSEPH B. PEDRICK.

Witnesses:
FRANK M. NOLTING,
LEONARD C. GRIFFITH.